March 28, 1939. B. TREVOR ET AL 2,152,335
SHORT WAVE SYSTEM
Original Filed Dec. 6, 1935 6 Sheets-Sheet 1
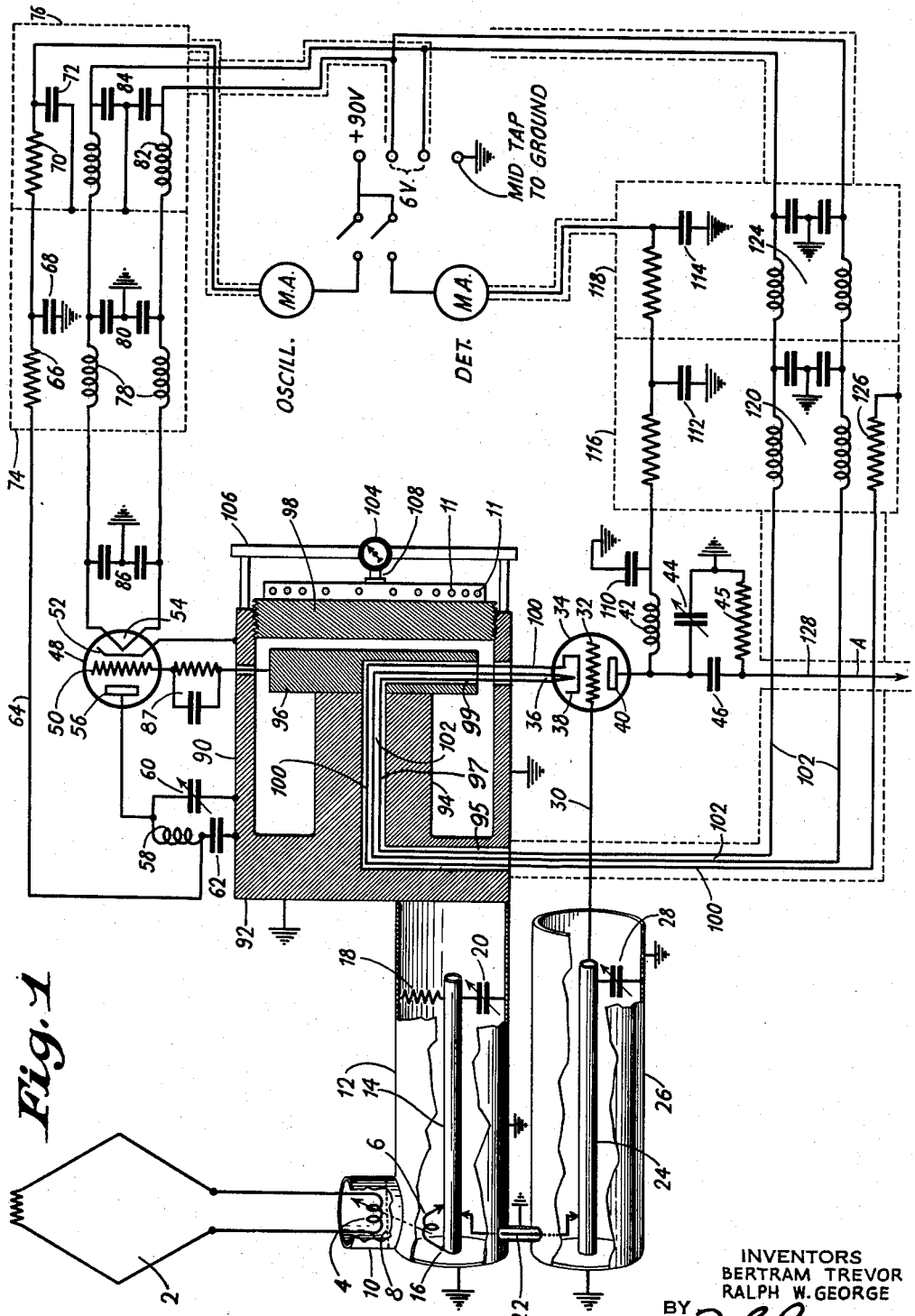
Fig. 1
INVENTORS
BERTRAM TREVOR
RALPH W. GEORGE
BY 
ATTORNEY

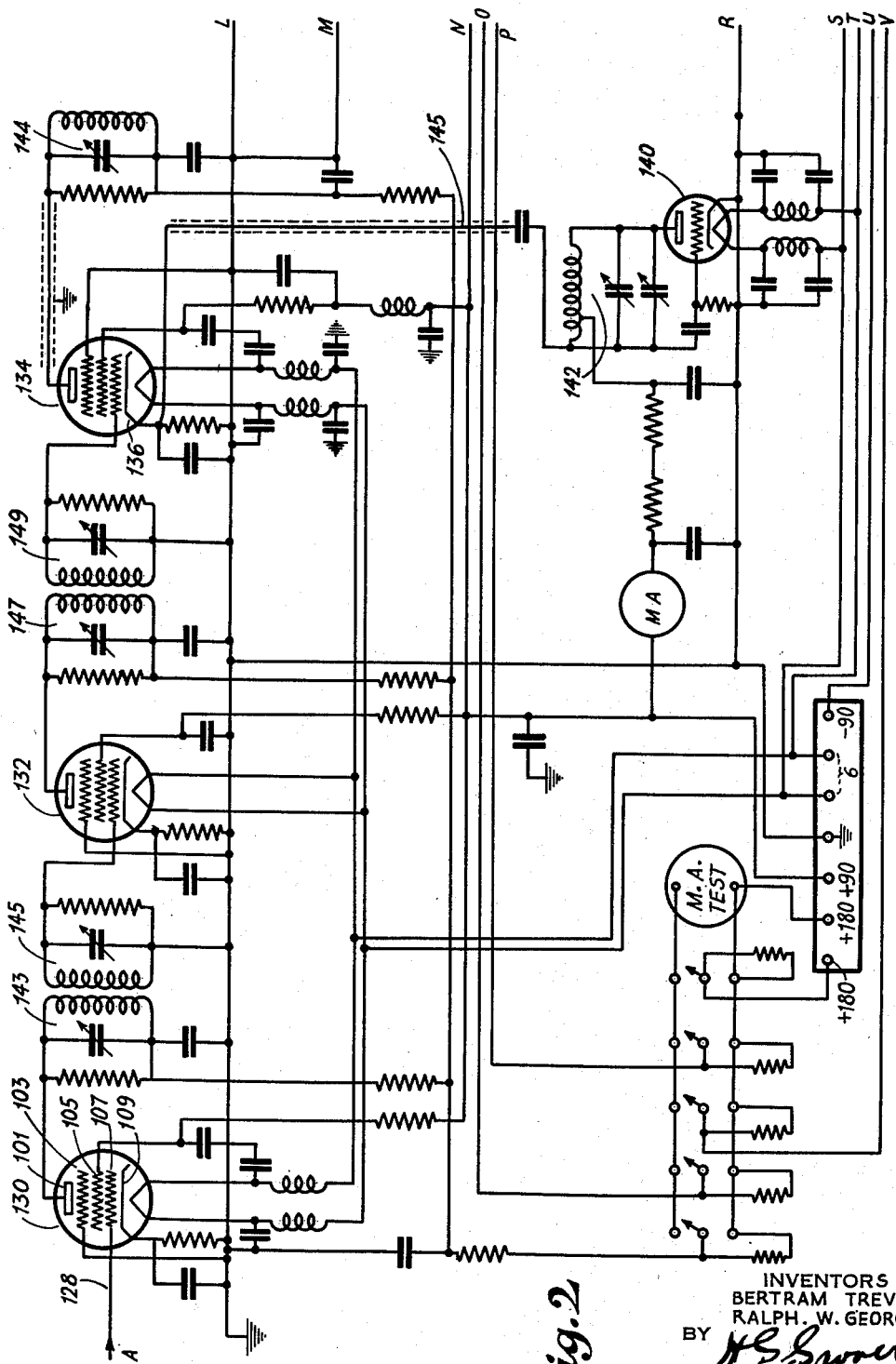

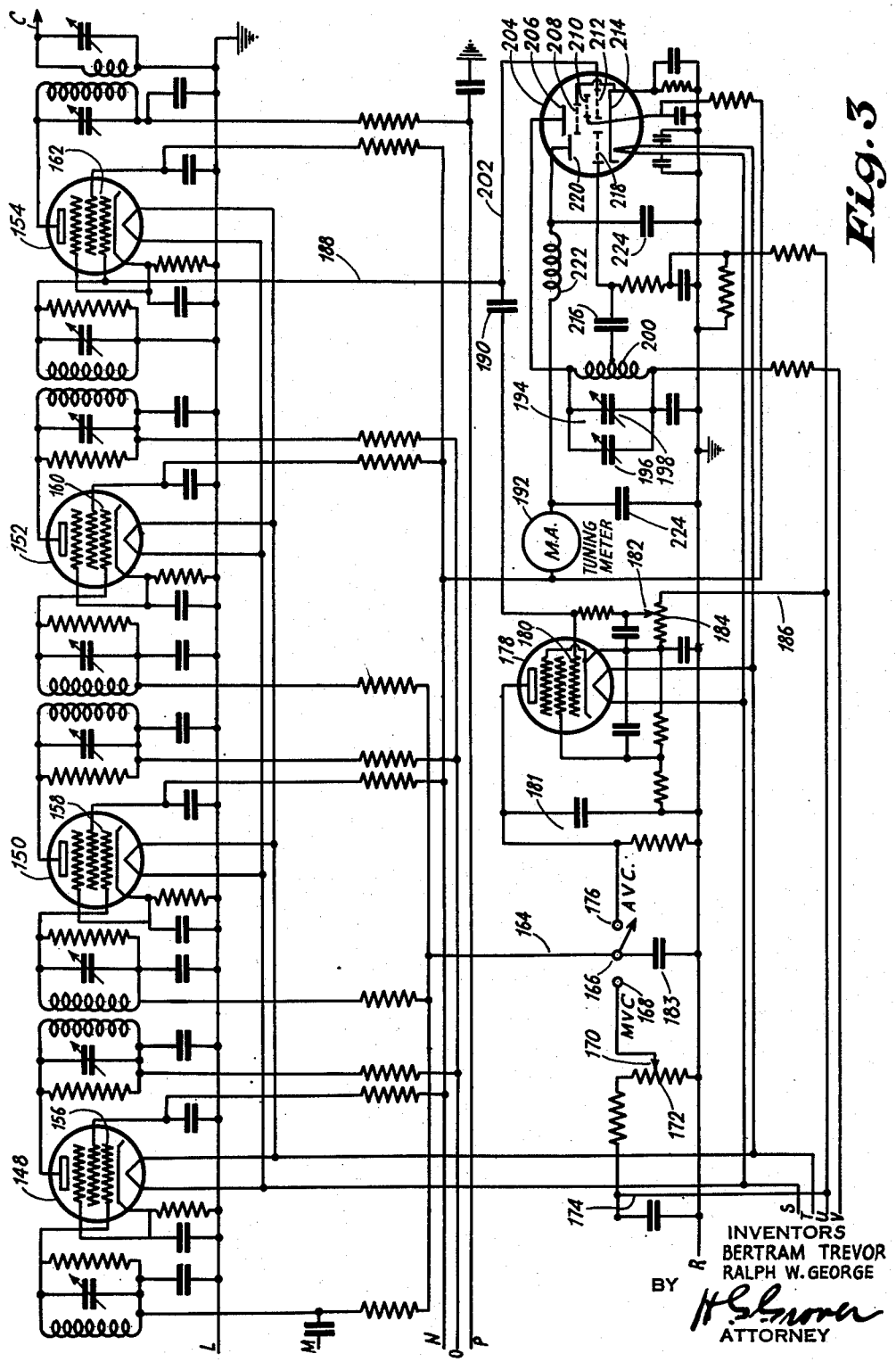

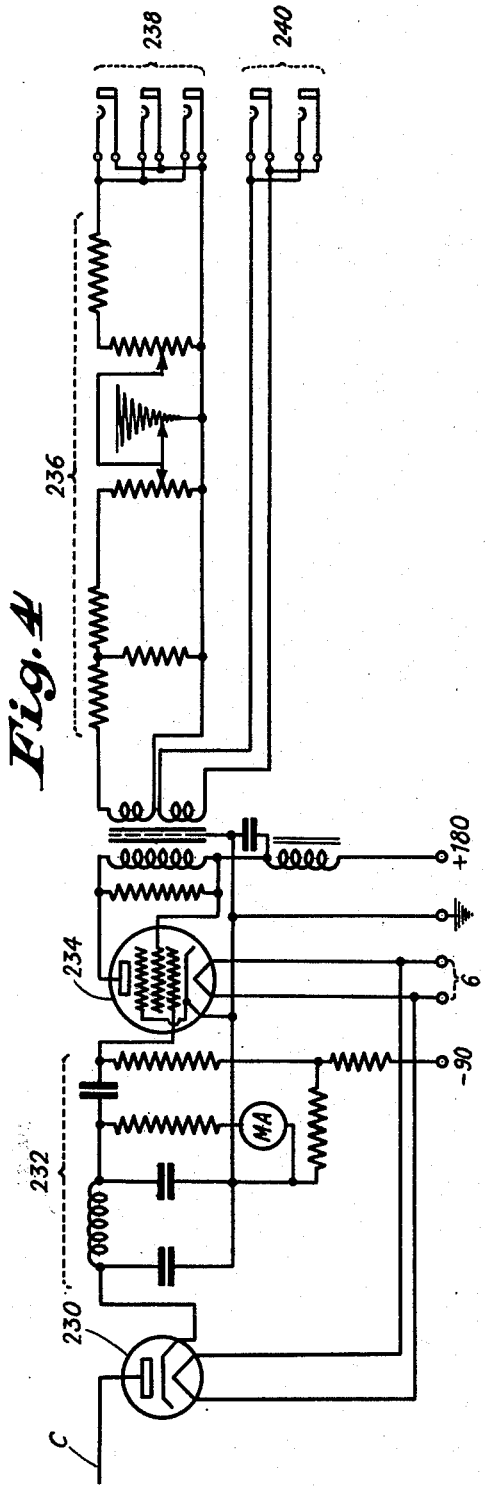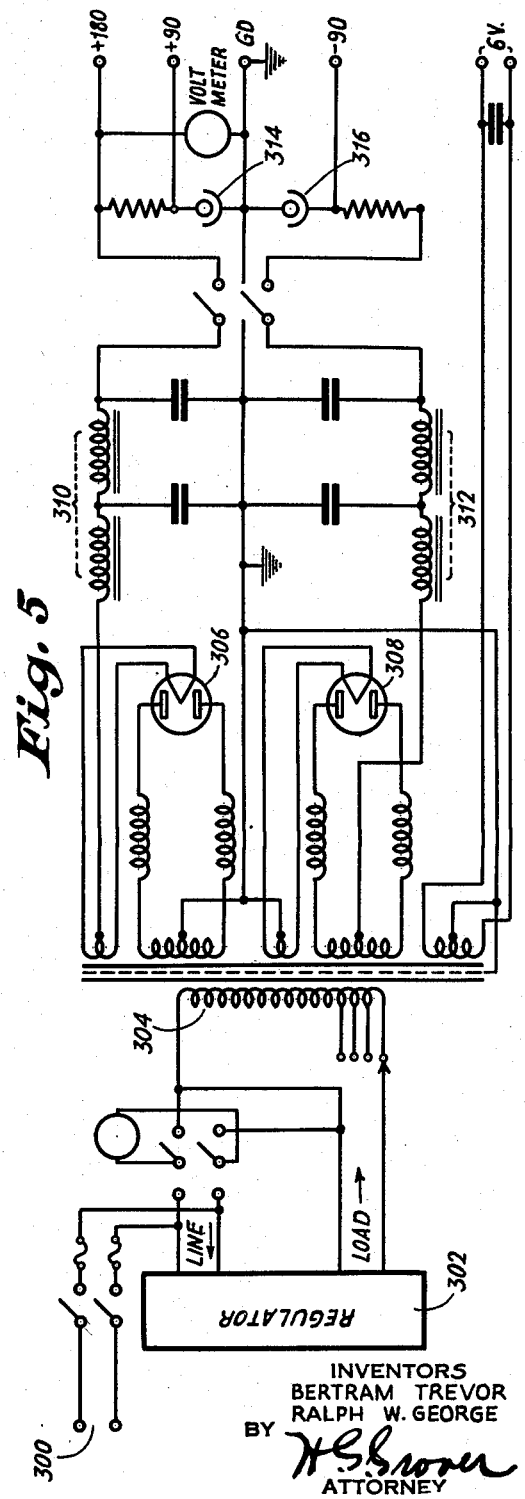

March 28, 1939.  B. TREVOR ET AL  2,152,335
SHORT WAVE SYSTEM
Original Filed Dec. 6, 1935    6 Sheets-Sheet 5

INVENTORS
BERTRAM TREVOR
RALPH W. GEORGE
BY
ATTORNEY

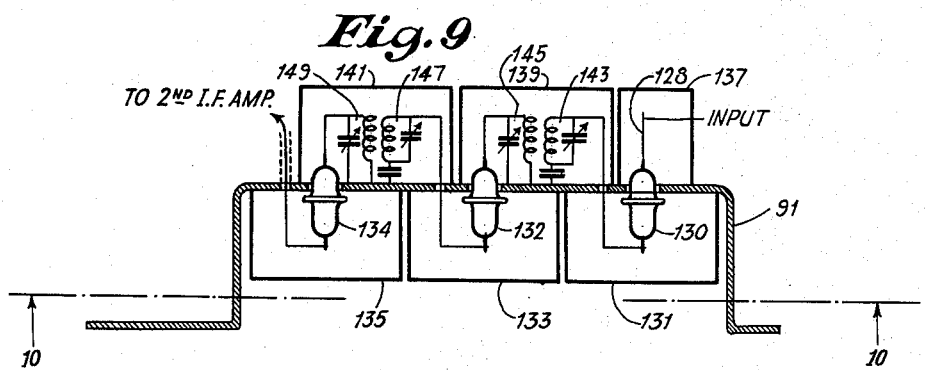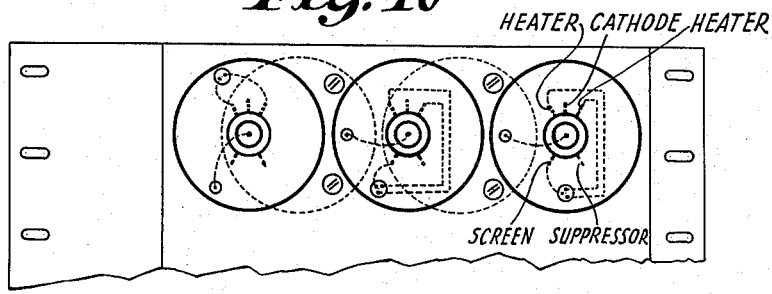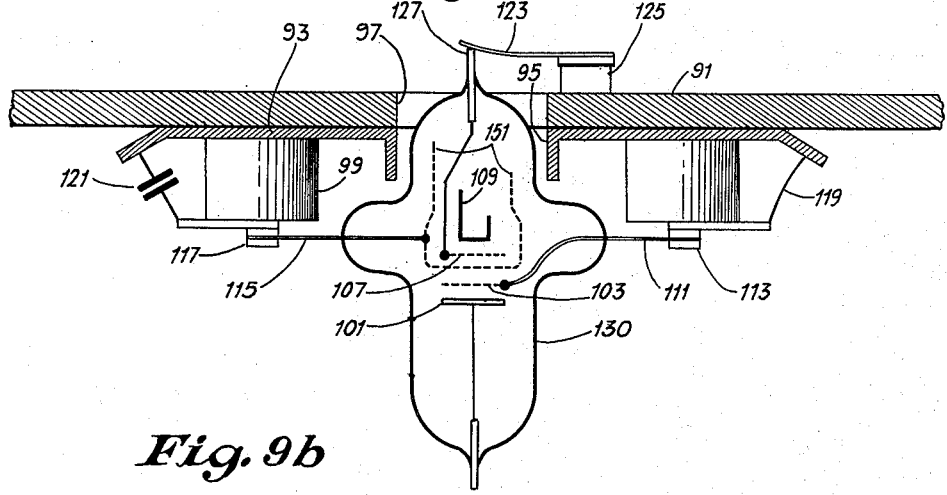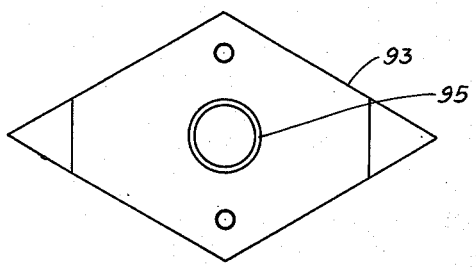

Patented Mar. 28, 1939

2,152,335

UNITED STATES PATENT OFFICE 2,152,335

SHORT WAVE SYSTEM

Bertram Trevor and Ralph W. George, Riverhead, N. Y., assignors to Radio Corporation of America, a corporation of Delaware Application December 6, 1935, Serial No. 53,136
Renewed October 1, 1938

16 Claims. (Cl. 250—20)

Our present invention has for its principal object the general improvement of apparatus for short wave radio signalling.

A further object of our present invention is to provide an improved high frequency oscillation generator which finds special usefulness in a superheterodyne receiver. A feature of this oscillator resides in its frequency controlling circuit which, preferably, is made of cast metal so as to be extremely rigid mechanically and of a low loss, whereby constancy of frequency of the generated oscillations at very high frequency is insured. In a preferred form of our improved frequency controlling circuit, the circuit consists of a cast metal cylinder closed off at one end. Internally and from the closed off base, there is provided a cylindrical metallic projection which, in turn, may be provided with a disc-like or otherwise enlarged head. A further metallic disc is screwed into the open end of the metal cylinder in such a way that the spacing between the head and the screwed in disc forms a low loss capacity, and the length of the projection a relatively low loss inductor. Together they form a tuned circuit which is resonant at the desired frequency of operation.

In general, the high frequency current in this low loss frequency controlling circuit flows along the outer surface of the metallic inner projection or cylinder. As a consequence, the magnetic lines of flux circulate about this space, between the projection and the inner surface of the metal cylinder, with a minimum if not a total absence of leakage in the surrounding atmosphere. As a consequence, the entire external surface of the low loss circuit is at ground radio frequency potential and is substantially unaffected by external circuits, for which reason it will readily be appreciated that the circuit serves as an extremely stable frequency controlling element.

This low loss frequency controlling circuit, in addition, may be made of a metal having a low temperature coefficient of expansion, such as Invar, and may be coated, after machining to proper size, with metals of higher conductivity, such as copper, silver or gold. In the alternative, the circuit may be constructed of a nonconductive material of low temperature coefficient of expansion, such as quartz or porcelain, and whose surfaces are coated with some conductive material such as copper or silver. To still further enhance frequency stability, the frequency controlling circuit, together with its associated vacuum tubes and other apparatus, may be placed within a temperature controlled oven, in turn, located within a roughly temperature controlled room.

A further object of our present invention is to provide some means for indicating the tuning for frequency operation of the apparatus in which our improved frequency controlling circuit is incorporated. This object is performed by associating a micrometer gauge with the disc which is screwed into the open end of the cylinder in such a way that the micrometer gauge indicates the relative spacing between the internal head and the adjustable or screw threaded disc. This spacing, of course, fixes the capacity of the system and hence by varying the spacing, as by screwing the disc towards or away from the internal head, the frequency of operation of the apparatus may be varied as desired and visually indicated upon the micrometer gauge.

Our improved frequency controlling circuit may, of course, be connected in various oscillator circuits, but we prefer to connect it between the grid and filament of a vacuum tube whose plate circuit is roughly tuned to the desired operating frequency. Because of the high frequencies involved, the tube, even when connected to our stable frequency controlling circuit, has a tendency to develop spurious oscillations, and to reduce such oscillations is a further object of our present invention. This is done by providing filters in the cathode and plate leads of our improved oscillation generators, particularly satisfactory results having been obtained by placing capacitive and resistance elements in the plate lead, and capacitive and inductive elements in the filament leads.

A further object of our present invention is to provide an improved circuit for deriving or removing high frequency oscillatory energy from our improved oscillation generator. This we do by looping a conductor through our improved frequency controlling circuit in such a way that the magnetic field of our improved frequency controlling circuit builds up and collapses through the loop conductor. This conductor, in turn, when the oscillator is used as a local oscillator of a superheterodyne receiver, is used to cause the filament or cathode of the first detector to oscillate in potential at the frequency of the local oscillation generator. To the grid of this detector, which preferably is maintained at ground radio frequency potential for shielding effects, there is applied the incoming signal, and from the plate circuit of the detector beat frequency energy is derived.

A still further object of our present invention is to provide an improved signal selecting circuit for use at very short waves, so as to properly feed the desired signal into the first detector, grid, or input circuit. A suitable selecting circuit consists, according to our present invention, of a metallic rod, pipe or tube grounded at one end and adjusted in length so as to resonate at the desired incoming carrier frequency. The antenna can be connected to one point along this rod and the grid of the first detector to another point along the rod, so chosen as to suitably load the rod and at the same time derive a suitable excitation voltage for the first detector from the rod or tube. Such an arrangement, however, in general would suffer from the disadvantage of being too selective and being rather difficult to adjust.

To overcome these objections is a still further object of our present invention, and this object we accomplish by providing a tuning condenser at the far end, that is at the ungrounded end of the rod, so as to permit ease of tuning. To broaden the frequency pass band of the rod, resistance is added to the circuit in a way which shall be described more fully hereinafter. In addition we find it advisable to shield the rod or tube by adding the grounded metallic cylinder around the tube.

This single rod arrangement, while it offers much that is to be desired, still lacks, in certain instances, the ability to pass a sufficiently wide band of frequencies into the first detector, particularly when the short wave receiver is used, for example, for facsimile work. Accordingly, a further object of our present invention is to provide an improved tube or rod circuit making use of a multiplicity of tubes or rods, preferably having overlapping resonance characteristics such that, in toto, the group of rods was connected to serve as a band pass filter passing the desired band of frequencies into the first detector.

Because of the high frequencies involved in the improved receiving system which we are about to describe in further detail hereinafter, the output of the first detector is beat or heterodyned down by means of a second local oscillator to a lower though superaudible intermediate frequency. Mainly because of ambient temperature changes, the local oscillators tend to cause an undesirable drift in the frequency of oscillations of the second or lower intermediate frequency. To lessen this evil is another object of our present invention. This object is effected by utilizing the following relations of frequency of operation and temperature coefficient of frequency:

1. When the first beating oscillator is operated on the high frequency side of the signal, both the first and second beating oscillators are made to have the same sign of temperature coefficient, regardless of which side of the first intermediate frequency the second beating oscillator is on.

2. When the first beating oscillator is on the low frequency side of the signal, the temperature coefficient of the first and second beating oscillators are made opposite in sign in order to have frequency compensation which will take place regardless of which side of the first intermediate frequency the second beating oscillator is on.

The desired frequency temperature coefficient for these oscillators may be obtained by proper choice of the materials used in their construction, particularly the materials used in the frequency controlling circuits.

A further object of our present invention is to provide an improved intermediate-frequency amplifier arrangement particularly adapted for intermediate frequencies of relatively very high value, such as for example, of the order of magnitude of 30 megacycles. However, it is to be clearly understood that this arrangement, which will be described in greater detail hereinafter, is not limited to any range of frequencies whether high or low, and may be used to good advantage over the entire frequency spectrum.

A further object of our present invention is to provide a frequency indicating system for the local oscillation generators which shall indicate the adjustment of the oscillators for producing intermediate frequency energy whose mean frequency shall be the mean frequency desired. This object we achieve by providing a sharply tuned, precise and efficient resonant circuit which is tuned to the desired mean intermediate frequency. A portion of the intermediate frequency energy produced is fed into this circuit and the output of this circuit is fed into a detector provided with a milliammeter for indicating the detector output. By adjusting the oscillators until the detector milliammeter reads a maximum, will indicate that the oscillators are then adjusted so as to provide the desired intermediate frequency energy having the correct mean frequency.

A further object of our present invention is to provide improved volume controlling apparatus which may be made either automatic or manual, at will.

Our present invention is described in greater detail with the aid of the accompanying drawings. These drawings, it is to be understood, are merely illustrative of the principles of our invention and are not, therefore, to be considered in any way as limitative.

In the drawings:

Figure 1 is a diagrammatic illustration, partly in wiring diagram form of, among other things, the first detector stage and first local oscillator generating stage of our improved ultra short wave length receiving system;

Figure 2 is a wiring diagram of the first intermediate frequency amplifier stages and second detector stage of our short wave receiver;

Figure 3 is a wiring diagram of the second intermediate frequency amplifier stages employed and also presents in wiring diagram form our improved tuning indicator and gain control circuits;

Figure 4 is a wiring diagram of the third and last detector and audio frequency amplifier of the receiver;

Figure 5 is a wiring diagram of the power supply system for our receiver;

Figures 9, 9A, 9B, and 10 illustrate a preferred mechanical and electrical construction and arrangement for our first intermediate frequency amplifier stages.

Figure 7:
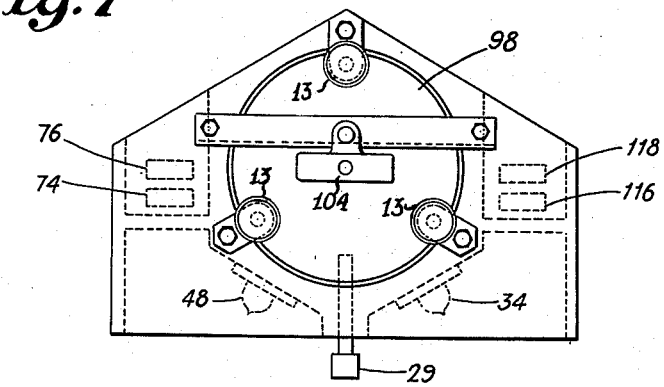
Figures 6, 7, 7A and 8 show in greater mechanical detail a preferred construction for the first local oscillator, and the first detector stages.

Turning to Figure 1, high-frequency energy is picked up on any suitable antenna, such as the diamond antenna 2, and fed to the primary 4 of a transformer variably coupled to the secondary 6. The two windings are electrostatically screened from each other by a screen diagrammatically indicated at 8 and mounted within a metallic cylinder 10, in turn facing into, and electrically and physically connected to the cylinder 12. Concentrically mounted within the cylinder 12 there is a rod, tube, or metal pipe 14, grounded at its left-hand end 16 and connected to ground at its right-hand end through a damping resistor 18 and variable tuning condenser 20. The metal rod 14 within the metal cylinder 12 forms a sharply selective input circuit, standing current waves being set up thereon by virtue of the input from the secondary 6 and by virtue of the tuning of condenser 20. In order to widen the band width of this sharply selective preselector circuit, the damping resistance 18 has been provided.

The received energy resonated in the rod 14 and condenser 20 is fed through a low impedance connection 22 to a second rod, tube or metallic pipe 24 mounted within a second cylinder 26 which is grounded as shown. The far end of the second rod 24 is tuned by means of the variable tuning condenser 28. The rod 24 and condenser 28 form a second non-radiating highly selective circuit and adjusted to have a resonant curve which overlaps the resonant curve of the rod 14-condenser 20 combination. In this way the frequency pass band width of the two preselector circuits 14, 20, 12 and 24, 26, 28 is further widened. That is to say, the two rods 14, 24, with their associated metallic cylinders 12 and 26, the damping resistor 18, and the tuning condensers 20, 28 form a preselector filter for our improved ultra-short wave length radio receiver. Coupling between the tuned circuits of our improved filter is adjusted by varying the taps of the low impedance connection 22 along the rods 14, 24. It is to be noted that at these high frequencies the grid of the detector tube presents a resistance load to rod 24 which forms part of the damping of the transformer system 12, 14, 24, 26, 18, 20, 28.

The received filtered energy is fed through lead 30 onto the grid 32 of the high-frequency detector tube 34 which, in addition, is provided with a heating filament 36, a heater surface or cathode 38 and a plate or anode 40. Local high-frequency oscillatory energy is injected into the detector tube 34 through the cathode leads, as will be explained more fully hereinafter, and the beat-frequency energy is resonated in the plate circuit of the first detector 34 by means of the tuning coil 42 and the tuning condenser 44, both of which are adjusted to the beat frequency. The beat frequency energy is fed through the by-passing condenser 46 and intermediate-frequency energy lead A to the intermediate-frequency amplifier, which also shall be described more fully hereinafter.

The first local oscillation generator is provided with a vacuum tube 48 having a grid 50, a cathode 52, a heating filament 54 and a plate or anode 56. The plate circuit of the tube 48 is provided with a plate tuning coil 58, a plate tuning condenser 60, and a by-passing condenser 62. Plate voltage is fed through the lead 64 which is kept at ground radio-frequency potential by the action of the by-passing condenser 62, and also the resistance condenser filters 66, 68, and 70, 72, housed within the shielding compartment 74, 76. Within the shield 74, 76 there are also provided the coil and condenser filters 78, 80, and 82, 84, which, together with the by-passing condensers 86, closely adjacent the heater filament 54, maintain the heater at ground radio-frequency potential. Proper grid bias is maintained by the action of the condenser and grid-leak combination 87.

Oscillations are generated because of plate-to-grid interelectrode feedback, and the frequency of oscillations is maintained constant by virtue of the improved frequency-controlling grid circuit, which will now be described in detail.

The radio-frequency grid tank circuit for the oscillator 48 is formed of a cast metal cylinder 90 having a grounded base portion 92. From the base portion and integral therewith there extends the central projection 94, which in turn is capped with a cast metal disc 96. Screwed into the open end of the cast metal cylinder 90, opposite the base 92, is another cast metal disc 98. This structure forms a high-frequency tuned circuit of exceptionally good mechanical rigidity and is made of metal of low temperature coefficient, such as Invar coated with a material of high electrical conductivity, and will maintain its electrical characteristics constant over a wide range of temperature, hence insuring constancy of frequency of operation of the first oscillator 48.

In general, it may be said that the confronting surfaces of the disc 96 and the screw threaded disc 98 form a low-loss condenser, and the length of the metallic projection between the disc 96 and the base 92, a low-loss inductor. This grid circuit is non-radiating, since the lines of flux are all contained within the cylinder 90, the base 92 and the disc 98. These latter elements, namely, the outer surfaces of the base 92, cylinder 90 and disc 98, are maintained at ground radio-frequency potential, and can be directly grounded, if desired, for direct currents as well.

From another viewpoint it may be said that high-frequency currents surge back and forth along the length of direction of the outer cylindrical surface of the projection 94, as a consequence of which the magnetic flux lines travel circularly in the space between the projection 94 and the cylinder 90. As the high-frequency currents flow back and forth at an exceedingly high rate, the flux lines build up and collapse through the cathode conductor 100 connected to the cathode 38 of the detector tube 34, and also through the heating leads 102 for the heater 36 of the first detector 34. Cathode conductor 100 and heating leads 102 extend through a channel 95 in the base 92, through channel 97 in projection 94, and through channel 99 in disc 96.

The frequency of the local oscillator is adjusted by screwing the metal disc 98 towards or away from the metallic disc 96. A micrometer gauge 104, bearing at one side and supported by the fixed supports 106, and at its other movable side 108 upon the disc 98, serves as a tuning indicator indicating the frequency of oscillations generated by the first local oscillation generator 48.

It has already been pointed out that the grid circuit for the local oscillator may be made of cast metal, such as copper, or of Invar with copper or silver plating after machining to size, so as to give a low-temperature coefficient of frequency variation. In addition, or in the alternative, the entire oscillator may be placed in a temperature controlled oven, and/or placed in a room which is roughly temperature-controlled to still further enhance frequency stability.

Because of the lines of magnetic flux which build up and collapse through the cathode conductors, 100, 102 for the first detector 34, the cathode 38 of the detector vibrates in potential at the frequency of the oscillations produced by the local oscillator 48. In addition, the grid 32 of the first detector 34 is vibrated through lead 30, as before explained, in potential and at the frequency of the incoming wave which may be of the order of 100 megacycles or three meters in wavelength. It has been found preferable to operate the local oscillator 48 above the incoming wave frequency to produce in the beat-frequency circuit 42, 44, and also in the beat-frequency lead A, beat-frequency energy of the order of 28 megacycles. It is to be clearly understood, however, that these figures are given simply by way of example, and are not to be construed in any way as limiting the present invention to these specific frequencies or wavelengths.

As was done with the case of the local oscillator 48, the first detector plate circuit is provided with a grounding condenser 110 and resistive and capacitive filters 112, 114 within the shielding compartments 116, 118. Also, the heating leads 102 for the first detector filament 36, are provided with the choke coil and condenser filters 120, 124, also mounted within the shielding compartments 116, 118. The grid 32 of the first detector 34 is maintained at ground direct-current potential and effective grid bias is obtained through the action of the plate current biasing resistor 126 connected in the cathode return lead 100.

The various voltages, meters and miscellaneous filters shown in Figure 1, are believed to be self-explanatory and of course are not to be considered, in any way, as limiting this invention.

Beat-frequency energy is resonated in the tank circuit for the first detector 34, which tank circuit consists of the tuning coil 42, the tuning condenser 44 and a resistance 45 broadening the frequency pass band of a plate circuit of the first detector 34. The beat-frequency energy is fed through the lead 128 at point A, Figure 1, to point A of lead 128, Figure 2, onto the control grid of the screen-grid-suppressor-grid beat-frequency amplifier tube 130. The output of the beat-frequency amplifier, or first intermediate-frequency amplifier tube 130, is fed to the second stage 132 of the first intermediate-frequency amplifier. The second stage also comprises a screen-grid-suppressor-grid amplifier. The output of the first intermediate-frequency amplifier tube is fed as indicated onto the control grid of the second detector 134. The cathode 136 of the second detector 134 is supplied with oscillations from a second local oscillator 140 having the tuned circuit 142 and its output lead 145 connected to the cathode 136 of the second detector 134.

Preferably, the second local oscillator 140 is tuned below the frequency of the intermediate-frequency oscillations produced by the first detector 34, and the first local oscillator 48 is adjusted to produce oscillations at a frequency above the incoming wave frequency. Then, if the two local oscillators have the same, or approximately the same, frequency variation with ambient temperature changes, the resultant beat-frequency in the circuit 144 will remain effectively constant despite changes in the surrounding temperatures.

The same result may be obtained by having the second local oscillator 140 tuned above the first intermediate-frequency and the first local oscillator 48 adjusted to produce oscillations of a frequency lower than the incoming wave-frequency while at the same time producing the desired beat-frequencies. In this case, however, the oscillators should be made to have temperature coefficients opposite in sign.

To summarize, if the first beating or local oscillator is operated on the high frequency side of the signal, both beating oscillators for frequency compensation should be made to have the same sign of temperature coefficient regardless of which side of the first intermediate frequency the second beating, local, or heterodyning oscillator is on. On the other hand, if the first beating oscillator is on the low frequency side of the signal, frequency compensation will occur provided the temperature coefficient of the second beating oscillator is made opposite in sign to that of the first. This latter effect will take place regardless of which side of the first intermediate frequency the second beating oscillator is on.

Because of the beating process and the second detector 134, the incoming waves beat down to the order of magnitude of 5 megacycles, and it is this second beat-frequency to which the plate circuit 144 of the second detector 134 is tuned.

This lower, or second, intermediate-frequency energy is amplified in the successive lower intermediate-frequency cascaded amplifier consisting of tubes 148, 150, 152 and 154.

The control grids 156, 158 and 160 of the lower intermediate-frequency amplifier tubes 148, 150 and 152 are connected together to a common grid-biasing lead 164 provided with a switch 166. In the left-hand position of the switch upon the tap 168, manual gain control is obtained by adjusting the tap 170 on the potentiometer arrangement 172 provided with suitable biasing potential through the lead 174.

For automatic gain control the switch 166 is moved to the right-hand top 176, whose potential is then determined by the output of the gain control detector 178 whose grid 180 is provided with a sufficient negative potential as to bias the tube 178 to cutoff. This cutoff adjustment is controlled by tap 182 on the potentiometer 184 supplied with negative biasing potential to the lead 186. A portion of the amplified energy of the third stage of the second intermediate amplifier is fed through lead 188 and by-passing condenser 190 to the control grid 180 of the gain control detector 178. This energy is rectified by the tube 178 and fed into a suitable time constant circuit 181 which includes condenser 183. The voltage across the time constant circuit is fed through lead 164 onto the grids of the second intermediate stage tubes 148, 150, 152 to maintain the output substantially constant.

Another feature of the present invention resides in the tuning indicator which guides the operator in the adjustment of the first radio-frequency local oscillator 48 and also, if desired, the second oscillator 140. This tuning indicator comprises a millimeter 192 and a precision type of tuned circuit 194 consisting of the condensers 196, 198 and coil 200. The condensers 196 and 198, and coil 200 are adjusted to exhibit parallel resonance effects at a frequency corresponding to the desired mid-frequency for the second intermediate-frequency amplifier stages 148, 150, 152, 154. A portion of the energy from the third stage of the second intermediate-frequency amplifier is fed through lead 188, lead 202 into the amplifier section of the tube 204, which amplifier section consists of a plate 206, a suppressor-grid 208, a screen-grid 210, a control-grid 212, and the right-hand portion of the cathode 214. The energy fed through lead 202 is amplified in the right-hand section of the tube 204 and fed into the efficient precise tuned circuit 194. A portion of this resonated energy is fed through the condenser 216 onto the left-hand control-grid 218 of tube 204. The bias on this control-grid is such as to give a rectifying action in the plate circuit of the left-hand plate 220 of the tube 204, and this rectified current is fed through the low-pass filter consisting of choke 222 and condensers 224 into the millimeter or tuning meter 192. Adjustment of the disk 98 until the tuning meter 192 gives maximum reading will indicate the fact that the first oscillator has been properly adjusted to give the proper second intermediate-frequency beat, with the second local oscillator 140 set at its proper value. Preferably the second oscillator 140 is permanently adjusted to operate at a desired frequency, although it may be varied if desired.

Output energy from the final stage 154 of the second intermediate-frequency amplifier is taken, as shown, from point C, Figure 3, and fed to point C, Figure 4, onto the plate of the diode rectifier, or third or final rectifier 230, Figure 4. The output of this rectifier is fed through a low-pass filter and coupling circuit 232 to an audio-frequency amplifier 234, as shown in Figure 4. The output of the audio-frequency amplifier is fed through the output level adjusting potentiometer circuits 236 into suitable jacks 238 for sound reproduction, facsimile reproduction, or, if desired, for television signal reproduction. Additional jacks 240 are provided for monitoring purposes.

A typical power supply system, which may be used in connection with the receiver system hereinabove described, is illustrated in Figure 5. The raw alternating current supply 300 is fed to a voltage regulator 302 and thence to the transformer 304 to a pair of full wave rectifiers 306, 308. In the output circuits of the full wave rectifiers, filters 310, 312 may be provided and also, if desired, voltage-dropping and voltage-regulating glow tubes 314, 316.

A preferred arrangement and construction for the intermediate-frequency amplifier stages 130, 132 and second detector 134 of Figure 2, is illustrated in Figures 9, 9A, 9B, and 10.

The prefered specific mounting is illustrated in Figures 9A and 9B. A copper shield 93 is provided with a sleeve 95 which is arranged coaxially with the tube opening in the panel 91. On top of the shield 93 there is mounted a tube socket 99 of suitable insulating material, such as isolantite, and the socket and shield are fixed to the panel by suitable screws or bolts (not shown). A tube such as Acorn tube 130 provided with a plate 101, a suppresser grid 103, and a cathode 109, is supported within the sleeve 95 and opening 97 by means of the suppressor lead 111, fixed to spring clip 113, and by means of the screen grid lead 115 fixed to the screen grid clip 117, and by the heater and cathode leads also protruding from the tube in the same plane.

The ends of the shield 93 are bent away from the body of the shield so that the suppressor may be directly connected thereto by means of a short connection 119. Similarly, the screen grid is connected to the other bent end of the shield through the bypassing condenser 121. A spring contact 123, mounted upon an insulation block 125 establishes contact with the control grid 107 through tube contact 127.

The foregoing tube securing arrangement is used in Figures 9 and 10, although not shown there in detail. Figure 10, as indicated, is a view of Figure 9 taken along the line 10, 10 with the shielding cans 131, 133, 135 removed. The upper halves of the tubes 130, 132, 134 of Figure 9 which protrude through the bath tub 91 are also provided with removable shields or cans 137, 139, 141, within which are mounted the tuned circuits 143, 145, 147 and 149 of Figure 2.

The construction illustrated in Figures 9 and 10 is particularly advantageous because of the fact that it minimizes plate to grid capacitance. This reduction in capacitance is assisted by the proximity of the cylindrical portion 151 of the screen grid 105 of Figure 9A to the grounded sleeve 95 attached to the copper shield and aluminum panel 97.

Moreover, in connection with various circuits, such as shown in Figure 2 and under present discussion, it is to be noted that numerous grounding connections directly to a member, such as an aluminum panel, are necessary for the proper operation of the circuits. The construction of Figures 9 and 10 therefore, is particularly useful in as much as numerous short, readily accessible grounding points are provided.

Also, the construction shown in Figures 9 and 10 is desirable because of the fact that it reduces stray interstage coupling and permits of ready access to the elements of the stages by simple removal of shields such as 131, 133, 135, 137, 139, and 141. Specifically, the controls for the adjustment of the condensers may be brought out to one side of the panel 91. By suitably staggering the shields 141, 139 and 137 with respect to the aforementioned shields, adjustments of the condensers within the stages may be made without removing the shielding cans, and from one side, for example, the front, of panel 91. Heretofore, as far as we are aware, interstage adjustment required manipulation of various elements from both sides of a supporting panel, which was decidedly inconvenient, a disadvantage overcome, obviously, by the present arrangement.

Figure 6:
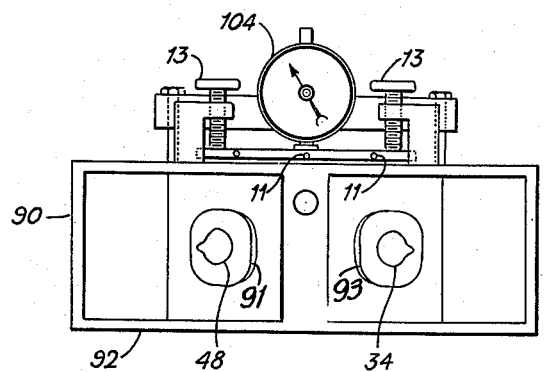
Figure 8:
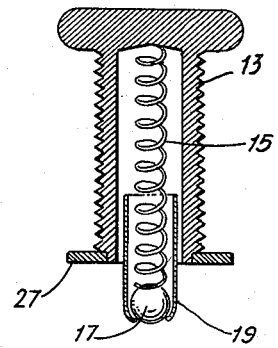

Figures 6 and 7 are respectively side and end views of a preferred mechanical construction for the high frequency local oscillator first detector stages 48, 34 of Figure 1. As shown in Figure 7 the low loss frequency controlling circuit is cast so as to have any suitable outline, such as that corresponding to a section of a hexagon. The disk 98 is provided with threads which loosely engage the female threads in the hexagon shaped base portion 92. Holes 11 are provided in the disk so that by means of any suitable rod shaped element the disk may be rotated. To permit rotation of the disk the locking screws 13, shown in greater detail and in cross section in Figure 8, are first slightly unscrewed. This permits the spring 15, within each of the members 13, to press the steel ball 17, slidingly retained by cylinders 19, against the disk 98. In this way, during rotation of the disk it is constantly urged to yieldingly engage only one pair of surfaces of the cooperating threads on the disk and pot 90, 92. In this way wobble of the disk during frequency adjustment with accompanying unwanted haphazard changes in frequency, are eliminated. Once the desired frequency has been obtained, the members 13 are screwed into place so that the faces 27 lockingly engage the outer surfaces of the disk tuning member 98.

As a further tuning refinement, a screw threaded rod 29, screw threaded into the base 90, 92 may be provided. This screw fits into a hole or opening in the disk 98 but does not make actual contact with the disk. Obviously, the relative position of screw 29 in the opening in disk 98 will permit of vernier adjustment of the capacity of the tuning system 90, 92, 96, 98.

Hollows 91 and 93 may be provided as shown in the casting 90, 92, Figures 6 and 7, so that the tubes 48 and 34 respectively the first local oscillator and the first detector tube, may be conveniently mounted therein. This construction is desirable because of its mechanical rigidity and electrical simplicity. In addition, within other hollows indicated by dotted lines in Figure 7, the filter elements 74, 76 and 116, 118 of Figure 1 may be placed and suitably supported.

Figure 7A:
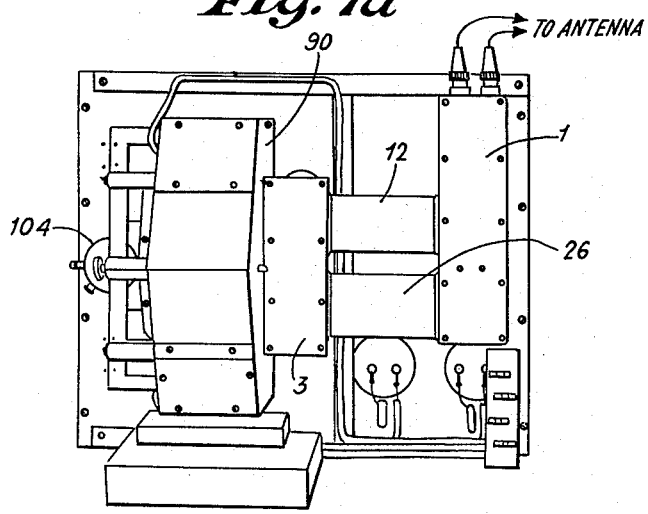

The metal cylinders 12, 26 of Figure 1 are preferably rigidly mounted against the base of Figure 6 to provide for additional mechanical and electrical stability. This is shown more clearly in Figure 7A wherein the cast housing 1 corresponds to cylinder 10 of Figure 1 and contains such elements as the coils 4, 6 and screen 8 of Figure 1. The housing 3 is bolted against the base 90 and contains such elements as resistance 18 and condensers 20, 28 of Figure 1.

Having thus described our invention, what we claim is:

1. A high frequency circuit including a metallic cylinder having metallic closures at both ends thereof, a projection internal of said cylinder and extending from one of the metallic closures of said cylinder, said other closure and the cooperating end of said cylinder being provided with threads for permitting the adjustment of said other closure of said cylinder with respect to the said projection, and a loop circuit extending internally of said projection through a conduit therein for establishing coupling with said high frequency circuit.

2. A high frequency oscillation generating system comprising a vacuum tube having a cathode, an anode and a grid, a resonant circuit tuned approximately to a desired frequency of operation connected between said anode and cathode, a direct current circuit for supplying anode potential connected between said anode and cathode said last mentioned circuit including series resistors and shunt capacitors for suppressing parasitic oscillation tendencies, a high frequency circuit consisting of a cast metal cylinder electrically closed at opposite ends by metal closures, said cylinder having an internal projection physically and electrically connected to and internally extending from one of said metal closures of said cylinder, a circular capacity member electrically and physically connected to the free end of said projection, said other metal closure comprising a capacity disc screwed into said cylinder and cooperatively associated with said memer, a connection from said projection to said grid, a connection from the external surface of said cylinder to said cathode, means including filtering elements for supplying heating potential to said cathode for energizing the same to an electron emitting condition, and means for deriving output energy from the foregoing apparatus comprising a conductor extending through a conduit in said projection and through a conduit in said capacity member.

3. A high frequency detector circuit comprising a vacuum tube having an anode, a cathode and a grid, means for maintaining said grid at ground direct current potential while causing it to fluctuate in potential in accordance with incoming signal waves, means for causing said cathode to fluctuate in potential in accordance with locally generated heterodyning waves, said last means comprising a vacuum tube having coupled thereto a frequency determining circuit in the form of a pair of coaxial conductors directly connected together at one of their adjacent ends and capacitively coupled together at their other ends, including a passageway through the interior of the inner one of said coaxial conductors, for the cathode leads of said first tube, and means coupled to said plate and cathode for deriving beat frequency energy from said detector.

4. In combination, a low loss tuned circuit comprising a metallic cylinder having a base at each end thereof, an internal projection extending from one base of said cylinder, means for varying the relative spacing between said projection and the other base of said cylinder, an electron discharge device having a grid, a cathode and a plate, a direct current connection from said projection to the grid of said device, a high frequency circuit connected between the plate of said device and the outer surface of said cylinder, and a direct current connection between said cathode and another point on the outer surface of said cylinder.

5. Apparatus as claimed in the preceding claim, characterized by the fact that said high frequency circuit consists of a circuit having inductance and capacity and tuned approximately to the frequency of said low loss tuned circuit.

6. Apparatus as claimed in claim 4, characterized by the fact that the circuit connected between said plate and said cylinder includes inductance and capacity and is tuned to approximately the frequency of said low loss circuit, being further characterized by the fact that the connection from said grid to said projection includes a condenser in circuit therewith, and being further characterized by the fact that the connection from said cathode to said cylinder is of low impedance.

7. In combination, a low loss tuned circuit comprising a metallic cylinder having a base at each end, an internal projection extending from one base of said cylinder, means for varying the capacity between said projection and said cylinder, a vacuum tube having a grid, a cathode and a plate, a high frequency circuit connected between said plate and a point on substantially one end of said cylinder, a connection between said grid and said internal projection, and a connection from said cathode to a point on substantially the other end of said cylinder.

8. In combination, a low loss circuit comprising a metallic cylinder having a closed-off base, a metallic projection extending from said base internally of said cylinder, said projection and base having a hollow portion forming a conduit, a conductor extending through said conduit and having its terminals external of said cylinder, a multi-electrode tube, and means for coupling said tube to the terminals of said conductor.

9. Apparatus as claimed in the preceding claim, characterized by the fact that the multi-electrode tube contains a cathode, a grid, and a plate, said conductor being connected to the cathode of the tube, and being further characterized by the fact that the grid of said tube is connected to a source of alternating current, and being further characterized by the fact that the plate of said tube is connected to a tunable circuit.

10. In combination, a circuit comprising a metallic cylinder having a closed-off base, a projection extending from said base and internally of said cylinder, said projection and base having a hollow portion forming a conduit therethrough, a vacuum tube having a cathode, a grid and an anode, a conductor extending through said conduit and being connected to one of the electrodes of said tube, and additional circuits connected to the other electrodes of said tube.

11. Apparatus as claimed in the preceding claim, characterized by the fact that said tube has a cathode element and a heater element for said cathode, said conductor being connected to said cathode, heater leads also lying within said conduit and connected to said heater, means for subjecting said grid to high frequency potentials while maintaining it at ground direct current potential, and a tuned circuit connected to the anode of said tube.

12. An oscillator-detector circuit for short waves comprising a metallic cylinder having a closed-off base, a metallic projection extending from said base internally of said cylinder, means for varying the capacity between said projection and said cylinder, an oscillator tube having a grid, a cathode and a plate, means including a resistance and a condenser connecting said grid to said projection, a low resistance direct current connection connecting said cathode to said cylinder, a tuned circuit including a coil and a variable condenser connecting said plate to said cylinder, a detector tube having a cathode, a heater for said cathode, a grid and a plate, the leads for said cathode and heater extending through openings in said cylinder and conduits within said base and projection whereby said cathode fluctuates in potential at a high frequency, means for subjecting the grid of said detector tube to high frequency potentials while maintaining it at ground direct current potential, and a circuit tuned to a beat frequency connected to the anode of said detector tube.

13. A low loss tuned circuit comprising a hollow conductor having an electrically conducting base at each end thereof, an internal conductor supported at one end from one base of said hollow conductor, the other end of said internal conductor being spaced away from the other base of said hollow conductor to form a capacitance, said last base being adjustable in position over a portion of the length of said hollow conductor for varying the spacing between said internal conductor and said last base with a consequent variation in the value of said capacitance, and an indicator fixedly mounted with respect to said hollow conductor and responsive to movement of said adjustable base for indicating the tuning of said circuit.

14. A low loss tuned circuit comprising a hollow conductor having an electrically conducting base at each end thereof, an internal conductor supported at one end from one base of said hollow conductor, the other end of said internal conductor being spaced away from the other base of said hollow conductor to form a capacitance, said last base being adjustable in position over a portion of the length of said hollow conductor for varying the spacing between said internal conductor and said last base with a consequent variation in the value of said capacitance, and a tuning indicator in the form of a micrometer gauge located externally of said hollow conductor, said gauge being fixedly mounted with respect to said internal conductor and responsive to movement of said adjustable base.

15. In combination, a low loss tuned circuit comprising a metallic cylinder having a base at each end thereof, an internal projection extending from one base of said cylinder, means for varying the relative spacing between said projection and the other base of said cylinder, means mounted on said low loss circuit for indicating the tuning thereof, an electron discharge device having a grid, a cathode and a plate, a direct current connection from said projection to the grid of said device, a high frequency circuit connected between the plate of said device and the outer surface of said cylinder, and a direct current connection between said cathode and another point on the outer surface of said cylinder.

16. A low loss tuned circuit comprising a hollow conductor having an electrically conducting base at each end thereof, an internal conductor supported at one end from one base of said hollow conductor, the other end of said internal conductor being spaced away from the other base of said hollow conductor to form a capacitance, said last base being screwed into said hollow conductor and adjustable in position over a portion of the length of said hollow conductor for varying the spacing between said internal conductor and said last base with a consequent variation in the value of said capacitance, a plurality of yieldable means located around said last base and exerting constant pressure thereon for eliminating undesired movement thereof with respect to said hollow conductor, and an indicator fixedly mounted with respect to said hollow conductor and responsive to movement of said adjustable base for indicating the tuning of said circuit.

BERTRAM TREVOR.
RALPH WALDO GEORGE.